(12) United States Patent
Nakajima et al.

(10) Patent No.: US 10,065,079 B2
(45) Date of Patent: Sep. 4, 2018

(54) GOLF BALL

(71) Applicant: Bridgestone Sports Co., Ltd., Minato-ku, Tokyo (JP)

(72) Inventors: Tsuyoshi Nakajima, Chichibushi (JP); Yuichiro Ozawa, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 15/495,264

(22) Filed: Apr. 24, 2017

(65) Prior Publication Data

US 2017/0225042 A1  Aug. 10, 2017

Related U.S. Application Data

(63) Continuation of application No. 14/961,975, filed on Dec. 8, 2015, now Pat. No. 9,675,845.

(30) Foreign Application Priority Data

Dec. 15, 2014  (JP) .................................. 2014-252721

(51) Int. Cl.
  *A63B 37/02*  (2006.01)
  *A63B 37/00*  (2006.01)

(52) U.S. Cl.
  CPC ........ *A63B 37/0051* (2013.01); *A63B 37/005* (2013.01); *A63B 37/0062* (2013.01); *A63B 37/0068* (2013.01); *A63B 37/0074* (2013.01)

(58) Field of Classification Search
  CPC ............ A63B 37/0068; A63B 37/0062; A63B 37/005; A63B 45/00; C08K 5/0025; C08K 3/04
  See application file for complete search history.

(56) References Cited

U.S. PATENT DOCUMENTS

| | | | | |
|---|---|---|---|---|
| 4,169,599 A | * | 10/1979 | Fujio | A63B 37/0003 260/998.14 |
| 4,726,590 A | * | 2/1988 | Molitor | A63B 37/02 473/372 |
| 6,306,049 B1 | | 10/2001 | Rajagopalan | |
| 2001/0012806 A1 | | 8/2001 | Cavallaro et al. | |
| 2011/0130219 A1 | * | 6/2011 | Komatsu | A63B 37/0003 473/374 |
| 2011/0143861 A1 | * | 6/2011 | Watanabe | A63B 37/0031 473/373 |
| 2013/0053181 A1 | | 2/2013 | Shindo et al. | |
| 2013/0172111 A1 | * | 7/2013 | Sakamine | A63B 37/0051 473/372 |
| 2013/0310196 A1 | | 11/2013 | Okabe | |
| 2014/0100059 A1 | * | 4/2014 | Kimura | A63B 37/0081 473/374 |
| 2014/0206476 A1 | * | 7/2014 | Sakamine | A63B 37/0054 473/372 |

FOREIGN PATENT DOCUMENTS

| | | |
|---|---|---|
| JP | 10-85367 A | 4/1998 |
| JP | 11-35633 A | 2/1999 |
| JP | 2002-102388 A | 4/2002 |
| JP | 2003-126300 A | 5/2003 |

* cited by examiner

*Primary Examiner* — John E Simms, Jr.
(74) *Attorney, Agent, or Firm* — Sughrue Mion, PLLC

(57) ABSTRACT

Golf ball having a core and a cover of one or more layers, the core being formed of a material molded under heat from a rubber composition including a base rubber, an organic peroxide, and water and/or a metal monocarboxylate. Defining the tan δ slope as $(\tan \delta_{10} - \tan \delta_1)/(10\% - 1\%)$, where $\tan \delta_1$ and $\tan \delta_{10}$ are the loss tangents at dynamic strains of, respectively, 1% and 10% when the loss tangents of the core center and the core surface are measured at −12° C. and 15 Hz, the difference between the tan δ slopes at the core surface and the core center is larger than 0.002. Because a core material which undergoes little decrease in resilience over time and experiences little energy loss can be obtained, the golf ball maintains a good rebound, has a reduced spin rate and thus is able to achieve an increased distance.

12 Claims, No Drawings

GOLF BALL

CROSS-REFERENCE TO RELATED APPLICATION

This application is a continuation of application Ser. No. 14/961,975, filed Dec. 8, 2015, which claims benefit to Japanese Patent Application No. 2014-252721 filed in Japan on Dec. 15, 2014, the entire contents of each of which are hereby incorporated by reference.

BACKGROUND OF THE INVENTION

Field of the Invention

The present invention relates to a golf ball having a core and a cover of one layer or a plurality of layers. The invention relates more particularly to a golf ball which, by maintaining a good rebound and having a reduced spin rate, is able to achieve an increased distance.

Prior Art

It is known that the hardness and resilience of crosslinked rubber vary with the moisture content therein. In light of this, various ways of adjusting the moisture content within rubber compositions in the manufacture of golf balls have been proposed. For example, JP-A 10-85367 discloses a technique that holds down decreases in core resilience by minimizing the moisture present in rubber compositions for golf balls.

JP-A 2002-102388 describes an attempt in which, as one means of lowering the rebound of practice golf balls, powdered rubber that has been subjected to moisture absorption is added to a rubber composition. However, such prior art does not address the challenge of providing a golf ball for regulation play which, by maintaining a good rebound and having a reduced spin rate, is able to achieve an increased distance.

Also, JP-A 2003-126300 discloses art which increases the rebound of golf balls by using zinc oxide having a small particle size in a rubber composition for golf ball cores. However, because this art does not control the crosslink density of the core, a core material which undergoes no decrease in resilience over time and experiences little energy loss cannot be reliably obtained.

It is therefore an object of this invention to obtain a core material which undergoes little decrease in resilience over time and experiences little energy loss, and thus to provide a golf ball which has a reduced spin rate and undergoes little decrease over time in rebound.

SUMMARY OF THE INVENTION

We have discovered that when a golf ball core is formed of a material molded under heat from a rubber composition that includes (A) a base rubber, (B) an organic peroxide and (C) water and/or a metal monocarboxylate, letting $\tan \delta_1$ be the loss tangent at a dynamic strain of 1% and $\tan \delta_{10}$ be the loss tangent at a dynamic strain of 10% when the loss tangents of the core center and the core surface are measured at a temperature of −12° C. and a frequency of 15 Hz, and defining the tan δ slope as $(\tan \delta_{10} - \tan \delta_1)/(10\% - 1\%)$, at a difference between the tan δ slope at the core surface and the tan δ slope at the core center that is larger than 0.002, a core material which undergoes little decrease in resilience over time and experiences little energy loss is obtained. Golf balls in which such a core material is used in the core, and the resulting core is encased by a cover of one layer or a plurality of layers, are able to achieve an increased distance by maintaining a good rebound and having a reduced spin rate.

The golf ball of the invention is thus a golf ball having a core and a cover of one layer or a plurality of layers, which core is formed of a material molded under heat from a rubber composition that includes (A) a base rubber, (B) an organic peroxide, and (C) water and/or a metal monocarboxylate. By suitably controlling the dynamic viscoelastic properties at the core center and the core surface, there can be obtained a golf ball which achieves a reduced spin rate and moreover undergoes little change in rebound even when used over an extended period of time.

More specifically, in the inventive golf ball having a core and a cover of one layer or a plurality of layers, decomposition of the organic peroxide within the core formulation can be promoted by the direct addition of water (or a water-containing material) to the core material. Moreover, it is known that the decomposition efficiency of the organic peroxide within the core-forming rubber composition changes with temperature and that, starting at a given temperature, the decomposition efficiency rises with increasing temperature. If the temperature is too high, the amount of decomposed radicals becomes too large, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to build-up of the heat of decomposition by the organic peroxide which has decomposed from the outside, becomes considerably higher than the mold temperature. When water (or a water-containing material) is added directly to the core, because the water acts to promote decomposition of the organic peroxide, radical reactions like those described above can be made to differ in the core center and at the core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. Moreover, it is possible to obtain a core having different dynamic viscoelastic properties at the core center.

By including the above core within a golf ball, a golf ball which achieves a reduced spin rate and also undergoes little change over time in rebound can be provided.

In cases where zinc monoacrylate is used instead of water, heat during kneading of the compounded material leads to the generation of water from the zinc monoacrylate. There can be obtained in this way an effect which is similar to that obtained by the addition of water.

Accordingly, the invention provides a golf ball which has a core and a cover of one layer or a plurality of layers, the core being formed of a material molded under heat from a rubber composition which includes: (A) a base rubber, (B) an organic peroxide, and (C) water and/or a metal monocarboxylate. Letting $\tan \delta_1$ be the loss tangent at a dynamic strain of 1% and $\tan \delta_{10}$ be the loss tangent at a dynamic strain of 10% when the loss tangents of the core center and the core surface are measured at a temperature of −12° C. and a frequency of 15 Hz, and defining the tan δ slope as $(\tan \delta_{10} - \tan \delta_1)/(10\% - 1\%)$, the difference between the tan δ slope at the core surface and the tan δ slope at the core center is larger than 0.002.

In a preferred embodiment of the golf ball of the invention, the difference (B)–(A) within the core between the JIS-C cross-sectional hardness (A) at a position 6 mm from the core center and the JIS-C cross-sectional hardness (B) at a position 16 mm from the core center is larger than 13.

In another preferred embodiment, the inventive golf ball satisfies the condition $V_0-V_{60}<0.7$, wherein $V_0$ is the initial velocity of the core in the golf ball after the cover has been molded, as measured after peeling away the cover, and $V_{60}$ is the core initial velocity measured 60 days after measuring $V_0$.

It is preferable for the moisture content in the rubber composition prior to vulcanization to be at least 1,000 ppm.

In the vulcanized core of the inventive golf ball, it is preferable for the core center to have a higher moisture content than the core surface.

In the golf ball of the invention, the rubber composition preferably contains from 0.1 to 5 parts by weight of an organosulfur compound per 100 parts by weight of the base rubber.

In the inventive golf ball, it is preferable for the core of the golf ball after the cover has been molded to have an initial velocity $V_0$, as measured after peeling away the cover, which is at least 77.0 m/s and not more than 78.5 m/s.

In the golf ball of the invention, it is preferable for the JIS-C hardness difference obtained by subtracting the core center hardness from the core surface hardness to be at least 20 and not more than 40.

Because a core material which undergoes little decrease in resilience over time and experiences little energy loss can be obtained, the golf ball maintains a good rebound and has a reduced spin rate, and therefore is able to achieve an increased distance.

DETAILED DESCRIPTION OF THE INVENTION

The objects, features and advantages of the invention will become more apparent from the following detailed description.

The golf ball of the invention has a core and a cover of one layer or a plurality of layers. The core is not limited to only one layer and may, if necessary, be composed of two or more layers. The core is formed of a material molded under heat from a rubber composition which includes as the essential ingredients: (A) a base rubber, (B) an organic peroxide, and (C) water and/or a metal monocarboxylate.

The base rubber serving as component (A) is not particularly limited, although the use of polybutadiene is especially preferred.

It is desirable for the polybutadiene to have a cis-1,4 bond content on the polymer chain of at least 60 wt %, preferably at least 80 wt %, more preferably at least 90 wt %, and most preferably at least 95 wt %. When the content of cis-1,4 bonds among the bonds on the polybutadiene molecule is too low, the resilience may decrease.

The content of 1,2-vinyl bonds included on the polybutadiene is typically not more than 2%, preferably not more than 1.7%, and more preferably not more than 1.5%, of the polymer chain. At a 1,2-vinyl bond content that is too high, the resilience may decrease.

The polybutadiene has a Mooney viscosity ($ML_{1+4}$ (100° C.)) of preferably at least 20, and more preferably at least 30, with the upper limit being preferably not more than 120, more preferably not more than 100, and even more preferably not more than 80.

The term "Mooney viscosity" used herein refers to an industrial indicator of viscosity (JIS K6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

The polybutadiene used may be one synthesized using a rare-earth catalyst or a group VIII metal compound catalyst. In this invention, the use of a polybutadiene synthesized with a rare-earth catalyst is especially preferred. Where necessary, an organoaluminum compound, an alumoxane, a halogen-containing compound and a Lewis base may be optionally used in combination with such a catalyst. In the practice of the invention, preferred use may be made of, as the various foregoing compounds, those mentioned in JP-A 11-35633.

Of the above rare-earth catalysts, the use of a neodymium catalyst that uses in particular a neodymium compound, which is a lanthanum series rare-earth compound, is especially recommended. In such cases, a polybutadiene rubber having a high cis-1,4 bond content and a low 1,2-vinyl bond content can be obtained at an excellent polymerization activity.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly, or two or more may be used in combination.

The organic peroxide (B) used in the invention is not particularly limited, although the use of an organic peroxide having a one-minute half-life temperature of 110 to 185° C. is preferred. One, two or more organic peroxides may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercially available product may be used as the organic peroxide. Specific examples include those available under the trade names Percumyl D, Perhexa C-40, Niper BW and Peroyl L (all produced by NOF Corporation), and Luperco 231XL (from Atochem Co.).

The water serving as component (C) in the invention is not particularly limited, and may be distilled water or tap water. The use of distilled water which is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition prior to vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan δ, which may make it difficult to mold a golf ball having little energy loss and a reduced spin rate. On the other hand, when the moisture content of the rubber composition is too high, the core may be too soft, which may make it difficult to obtain a suitable core initial velocity.

It is also possible to add water directly to the rubber composition. The following methods (i) to (iii) may be employed to include water:
(i) applying steam or ultrasonically applying water in the form of a mist to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the golf ball production efficiency to be enhanced. The type of material in which a given amount of water has been included, although not particularly limited, is exemplified by fillers, unvulcanized rubbers and rubber powders in which sufficient water has been included. The use of a material which causes no loss of resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In this invention, a metal monocarboxylate may be used instead of the above-described water. Metal monocarboxylates, in which the carboxylic acid is presumably coordination-bonded to the metal, are distinct from metal dicarboxylates such as zinc diacrylate of the formula $(CH_2=CHCOO)_2Zn$. A metal monocarboxylate introduces water into the rubber composition by way of a dehydration/condensation reaction, and thus provides an effect similar to that of water. Moreover, because a metal monocarboxylate can be added to the rubber composition as a powder, the operations can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. When the amount of metal monocarboxylate included is too small, it may be difficult to obtain a suitable crosslink density and tan δ, as a result of which a sufficient golf ball spin rate-lowering effect may not be achievable. On the other hand, when too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

In addition to above-described components (A) to (C), it is possible to also include in the rubber composition: (D) an organosulfur compound, (E) a co-crosslinking agent, and (F) an inert filler. If necessary, antioxidants may also be included. These ingredients are described in detail below.

(D) Organosulfur Compound

An organosulfur compound may be included in the rubber composition. The organosulfur compound is exemplified by, but not particularly limited to, thiophenols, thionaphthols, halogenated thiophenols, and metal salts thereof. Specific examples include the zinc salts of pentachlorothiophenol, pentafluorothiophenol, pentabromothiophenol and p-chlorothiophenol, and diphenylpolysulfides, dibenzylpolysulfides, dibenzoylpolysulfides, dibenzothiazoylpolysulfides and dithiobenzoylpolysulfides having from 2 to 4 sulfurs. These may be used singly or two or more may be used in combination. Of the above, preferred use may be made of the zinc salt of pentachlorothiophenol and/or diphenyldisulfide.

It is recommended that the organosulfur compound be included in an amount, per 100 parts by weight of the base rubber, of preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. When the amount of organosulfur compound included is too large, the material molded under heat from the rubber composition may have a hardness that is too low. On the other hand, when the amount included is too small, an improvement in the resilience may be unlikely to occur.

(E) Co-Crosslinking Agent

The co-crosslinking agent is a metal salt of an α,β-unsaturated carboxylic acid having from 3 to 8 carbons. In this invention, "co-crosslinking agent" refers to a material which lacks the above-mentioned dehydration reaction. Illustrative examples of the α,β-unsaturated carboxylic acid include acrylic acid, methacrylic acid, maleic acid and fumaric acid. Acrylic acid is preferred because it confers a high resilience. The metal of the metal salt is exemplified by zinc, sodium, magnesium, calcium and aluminum, with zinc being especially preferred. Accordingly, zinc acrylate is preferred as the co-crosslinking agent.

The co-crosslinking agent has an average particle size of preferably from 3 to 30 μm, more preferably from 5 to 25 μm, and even more preferably from 8 to 15 μm. When the co-crosslinking agent has an average particle size of less than 3 μm, it tends to aggregate within the rubber composition, as a result of which the reactivity between acrylic acid molecules increases and the reactivity between molecules of the base rubber decreases, which may make it impossible to obtain a sufficient golf ball rebound. On the other hand, when the co-crosslinking agent has an average particle size greater than 30 μm, the co-crosslinking agent particles are too large, leading to a large variability in the properties of the resulting golf ball. The co-crosslinking agent is included in an amount per 100 parts by weight of the base rubber which, although not particularly limited, is preferably from 3 to 60 parts by weight, more preferably from 5 to 45 parts by weight, and even more preferably from 20 to 40 parts by weight. If the amount included is less than the above range, the material molded under heat from the rubber composition may be too soft, resulting in a poor resilience. On the other hand, if the amount included is greater than the above range, the material molded under heat from the rubber composition may be too hard, resulting in a poor feel at impact for the golf ball.

As mentioned above, when a metal monocarboxylate is used instead of water in this invention, it is preferable for the relative proportions of the co-crosslinking agent and the metal monocarboxylate, expressed as the weight ratio "metal monocarboxylate/co-crosslinking agent," to be within the range of 0.1 to 10.

(F) Inert Filler

Illustrative examples of inert fillers include inorganic fillers such as zinc oxide, barium sulfate and calcium carbonate. The amount of inert filler included per 100 parts by weight of the base rubber is preferably at least 1 part by weight, more preferably at least 3 parts by weight, and even more preferably at least 5 parts by weight. The upper limit is preferably not more than 100 parts by weight, more preferably not more than 60 parts by weight, even more preferably not more than 45 parts by weight, and most preferably not more than 40 parts by weight.

Antioxidant

In this invention, an antioxidant may be optionally included in the rubber composition. For example, use may be made of a commercially available product such as Nocrac NS-6, Nocrac NS-30 or Nocrac 200 (all products of Ouchi Shinko Chemical Industry Co., Ltd.). These may be used singly, or two or more may be used in combination. The amount of antioxidant included is not particularly limited, and may be set to preferably at least 0.1 part by weight, and more preferably at least 0.15 part by weight, per 100 parts by weight of the base rubber. The upper limit may be set to preferably not more than 5.0 parts by weight, more preferably not more than 4.0 parts by weight, and even more preferably not more than 3.0 parts by weight. When too much or too little antioxidant is included, a proper core hardness gradient may not be obtained, which may make it impossible to achieve a good rebound and a good spin rate-lowering effect on full shots.

The core in this invention may be obtained by using a method similar to that used with conventional golf ball rubber compositions to vulcanize and cure the above-described rubber composition. Exemplary vulcanization conditions include a vulcanization temperature of between 100 and 200° C. and a vulcanization time of from 5 to 40 minutes.

It is recommended that the core diameter be preferably at least 32 mm, more preferably at least 34 mm, and even more preferably at least 36 mm, with the upper limit being preferably not more than 40 mm, more preferably not more than 39 mm, and even more preferably not more than 38 mm. When the diameter is too small, a sufficient spin rate-lowering effect and a sufficient rebound may not be achievable. On the other hand, when the diameter is too large, it may not be possible to obtain a sufficient spin rate-lowering effect, in addition to which the advantageous effects normally conferred by the cover may not be attainable.

It is recommended that the core (hot-molded material) have a deflection when compressed under a final load of 1,275 N (130 kgf) from an initial load state of 98 N (10 kgf) which, although not particularly limited, is preferably at least 2.5 mm, more preferably at least 2.8 mm, and even more preferably at least 3.0 mm, with the upper limit being preferably not more than 8.0 mm, more preferably not more than 7.8 mm, and even more preferably not more than 7.5 mm. At a deflection larger than this range, the core may become too soft, as a result of which the rebound may decrease. On the other hand, at a deflection smaller than this range, a spin rate-lowering effect may not be obtained and the feel of the ball at impact may end up being hard.

Next, the core hardness is explained. The core has a center hardness expressed in terms of JIS-C hardness which, although not particularly limited, is preferably at least 45, more preferably at least 50, and even more preferably at least 52. The upper limit value is preferably not more than 70, more preferably not more than 65, and even more preferably not more than 60. At a core center hardness outside of this range, a spin rate-lowering effect may not be attainable.

The core has a surface hardness expressed in terms of JIS-C hardness which, although not particularly limited, is preferably at least 65, more preferably at least 70, and even more preferably at least 72. The upper limit value is preferably not more than 95, more preferably not more than 90, and even more preferably not more than 88. At a core surface hardness lower than this range, the spin rate may increase too much and the resilience may decrease, as a result of which a sufficient distance may be obtained. On the other hand, at a core surface hardness higher than this range, the feel at impact may be too hard or the durability to cracking on repeated impact may worsen.

The JIS-C hardness difference obtained by subtracting the core center hardness from the core surface hardness (core surface hardness−core center hardness), although not particularly limited, is preferably at least 15, more preferably at least 17, and even more preferably at least 20. The upper limit is preferably not more than 40, more preferably not more than 35, and even more preferably not more than 30. When this hardness difference value is too small, the spin rate-lowering effect on shots with a W#1 may be inadequate, as a result of which a good distance may not be achieved. On the other hand, when the hardness difference value is too large, the initial velocity of the golf ball on an actual shot may decrease, resulting in a poor distance. As used herein, "center hardness" refers to the hardness as measured at the center of the cross-section obtained by cutting the core in half through the center, and "surface hardness" refers to the hardness measured at the spherical surface of the core. Also, "JIS-C hardness" refers to the hardness measured with a JIS-C spring-type durometer, as specified in JIS K 6301-1975.

We have also found from our research that the spin rate-lowering effect on shots with a W#1 can be enhanced by optimizing the respective hardnesses at positions 6 mm and 16 mm from the center of the core. Specifically, the difference (B)−(A) between the JIS-C cross-sectional hardness (A) at a position 6 mm from the core center and the JIS-C cross-sectional hardness (B) at a position 16 mm from the core center is preferably larger than 13, more preferably larger than 14, and further preferably larger than 16. The JIS-C hardness at a position 6 mm from the core center is preferably at least 47, more preferably at least 52, and even more preferably at least 54, with the upper limit being preferably not more than 72, more preferably not more than 67, and even more preferably not more than 64. The JIS-C hardness at a position 16 mm from the core center is preferably at least 63, more preferably at least 68, and even more preferably at least 70, with the upper limit being preferably not more than 93, more preferably not more than 88, and even more preferably not more than 86. When the above numerical range is not satisfied, it may not be possible to enhance the spin rate-lowering effect on shots with a W#1.

In this invention, it is preferable for the core center in the vulcanized core to have a higher moisture content than the core surface. The moisture content of the molded core can be suitably controlled by adjusting such conditions as the amount of water included in the rubber composition, the molding temperature and the molding time.

The moisture content at the core center, although not particularly limited, is preferably at least 1,000 ppm, more preferably at least 1,200 ppm, and even more preferably at least 1,500 ppm. The upper limit is preferably not more than 7,000 ppm, more preferably not more than 6,000 ppm, and even more preferably not more than 5,000 ppm. The moisture content at the core surface, although not particularly limited, is preferably at least 800 ppm, more preferably at least 1,000 ppm, and even more preferably at least 1,200 ppm. The upper limit is preferably not more than 5,000 ppm, more preferably not more than 4,000 ppm, and even more preferably not more than 3,000 ppm. The (moisture content at core surface)−(moisture content at core center) value is preferably 0 ppm or below, more preferably −100 ppm or below, and even more preferably −200 ppm or below. The lower limit value is preferably −1,000 ppm or above, more preferably −700 ppm or above, and even more preferably −600 ppm or above.

Measurement of the above moisture content can be carried out with ordinary instruments. For example, the moisture content can be measured using the AQ-2100 coulometric Karl Fischer titrator and the EV-2000 evaporator (both available from Hiranuma Sangyo Co. Ltd.) at a measurement temperature of 130° C., a preheating time of 3 minutes and a background measurement time of 30 seconds.

Letting $V_0$ be the initial velocity of the core measured after removing the cover from a ball obtained by molding the cover material over the core and $V_{60}$ be the initial velocity of the core measured 60 days after the day on which $V_0$ was measured, $V_0$ is preferably at least 77.0 m/s, more preferably at least 77.1 m/s, and even more preferably at least 77.2 m/s, but preferably not more than 78.5 m/s, more preferably not more than 78.3 m/s, and even more preferably not more than 78.0 m/s. $V_{60}$ is preferably at least 77.0 m/s, and more preferably at least 77.1 m/s, but preferably not more than 77.8 m/s, more preferably not more than 77.7 m/s, and even more preferably not more than 77.6 m/s. When core initial velocities $V_0$ and $V_{60}$ within the above ranges cannot be obtained, achieving a satisfactory distance is difficult. Also, if the core initial velocity is too high, the golf ball may not conform to the Rules of Golf. Because the cover material is not readily permeable to moisture in the atmosphere, there are cases where the change in core initial velocity over time cannot be measured using the ball as is or where it takes a long time for such change to occur. Therefore, by removing the cover and exposing the core itself to the atmosphere, it is possible to reliably measure the change in core initial velocity over time.

The value $V_0-V_{60}$ preferably satisfies the relationship $V_0-V_{60}<0.7$, more preferably satisfies the relationship $V_0-V_{60}<0.6$, and still more preferably satisfies the relationship $V_0-V_{60}<0.5$. In this invention, in cases where moisture has been included in a good balance within the core, even if the core comes directly into contact with the atmosphere, it is not readily influenced by the atmospheric humidity, enabling changes in the core initial velocity to be suppressed.

In the invention, the core initial velocity can be measured using an initial velocity measuring apparatus of the same type as the USGA drum rotation-type initial velocity instrument approved by the R&A. In this case, the core can be tested in a chamber at a room temperature of 23±2° C. after being held isothermally in a 23±1° C. environment for at least 3 hours.

Next, the method of measuring the dynamic viscoelasticity of the core is explained. An essential feature of this invention is that, letting tan $\delta_1$ be the loss tangent at a dynamic strain of 1% and tan $\delta_{10}$ be the loss tangent at a dynamic strain of 10% when the loss tangents of the core center and the core surface are measured at a temperature of −12° C. and a frequency of 15 Hz in a dynamic viscoelasticity test on vulcanized rubber at the core center and core surface, and defining the tan δ slope as (tan $\delta_{10}$−tan $\delta_1$)/(10%−1%), the difference between the tan δ slope at the core surface and the tan δ slope at the core center is larger than 0.002. This difference in slopes is preferably larger than 0.003, and more preferably larger than 0.004. At a small difference in slope, the energy loss by the core ends up being large, making a spin rate-lowering effect difficult to obtain. Various methods may be employed to measure the dynamic viscoelasticity performance of the core. For example, a circular disk having a thickness of 2 mm may be cut out of the cover-encased core by passing through the geometric center thereof and treating this as the sample, then using a punching press to punch out 3 mm diameter specimens at the places of measurement. In addition, by employing a dynamic viscoelasticity measuring apparatus (such as that available under the product name EPLEXOR 500N from GABO) and using a compression test holder, the tan δ values under dynamic strains of 0.01 to 10% can be measured at an initial strain of 35%, a measurement temperature of −12° C. and a frequency of 15 Hz, and the slopes determined based on the results of these measurements.

Regarding the viscoelasticity behavior measured in this way, there is known to be a correlation between the viscoelastic behavior in the high-strain region and the spin rate of the golf ball when struck. Thus, when the tan δ in the high-strain region is relatively large, i.e., when the tan δ slope between a dynamic strain of 10% and a dynamic strain of 1% is large, the spin rate increases; conversely, when the tan δ in the high-strain region is relatively small, i.e., when the tan δ slope between a dynamic strain of 10% and a dynamic strain of 1% is small, the spin rate decreases. Also, the amount of deformation varies with the club that strikes the golf ball, with deformation occurring even at the ball center when the ball is struck with a driver or a middle iron (e.g., number six iron). Therefore, when striving to reduce the spin rate on shots with a driver or a number six iron, good results can be obtained by making the tan δ slope between a dynamic strain of 10% and a dynamic strain of 1% at the core center small. In cases where the deformation on impact is small, such as on approach shots near the green, the influence of the tan δ at the core surface is large. Hence, to increase or maintain the spin rate on approach shots, good results can be obtained by making the tan δ slope between a dynamic strain of 10% and a dynamic strain of 1% at the core surface large. Accordingly, to obtain a golf ball that travels well on shots with a driver and stops on approach shots, what is desired is for the tan δ slope between a dynamic strain of 10% and a dynamic strain of 1% at the core center to be made small and for the tan δ slope between a dynamic strain of 10% and a dynamic strain of 1% at the core surface to be made large; that is, for the difference between the tan δ slope at the core surface and the tan δ slope at the core center to be made large.

Next, the cover of one layer or a plurality of layers encasing the core is described. The cover material is not particularly limited, although use can be made of known materials such as various ionomeric resins and urethane elastomers that are used in golf balls.

To achieve an even further spin rate-lowering effect, it is especially preferable to use a highly neutralized ionomeric material in the cover layer adjoining the core. Specifically, the use of a material formulated from components (a) to (d) below is preferred; that is, a mixed material obtained by the admixture of:
100 parts by weight of a resin component obtained by blending
(a) a base resin containing
  (a-1) an olefin-unsaturated carboxylic acid random copolymer and/or a metal ion neutralization product of an olefin-unsaturated carboxylic acid random copolymer, and
  (a-2) an olefin-unsaturated carboxylic acid-unsaturated carboxylic acid ester random copolymer and/or a metal ion neutralization product of an olefin-unsaturated carboxylic acid-unsaturated carboxylic acid ester random copolymer
  in a weight ratio of from 100:0 to 0:100 with
(b) a non-ionomeric thermoplastic elastomer
  in a weight ratio of from 100:0 to 50:50;
(c) from 5 to 80 parts by weight of a fatty acid and/or fatty acid derivative having a molecular weight of between 228 and 1500; and
(d) from 0.1 to 17 parts by weight of a basic inorganic metal compound capable of neutralizing unneutralized acid groups on component (a) and component (c).

In cases where a mixed material of above components (a) to (d) is used, it is especially preferable to use a mixed material in which at least 70% of the acid groups are neutralized.

The material making up the outermost layer of the cover is preferably one composed primarily of a urethane material, and especially a thermoplastic urethane elastomer.

In addition, one, two or more intermediate cover layers may be formed between the cover layer adjoining the core and the outermost cover layer. In such a case, the use of a thermoplastic resin such as an ionomer as the intermediate layer material is preferred.

To obtain the cover in this invention, use may be made of, for example, a method in which a single-layer core or a multilayer core of two or more layers that has been prefabricated according to the type of ball is placed within a mold, then the above mixture is mixed and melted under applied heat and injection-molded over the core so as to encase the core with the desired cover. In this case, cover production can be carried out in a state where excellent thermal stability, flowability and processability are achieved. As a result, the golf ball ultimately obtained has a high rebound, and moreover has a good feel at impact and an excellent scuff resistance. Alternatively, use may be made of a different cover-forming method, such as one in which, for example, a pair of hemispherical half-cups are molded beforehand from the above-described cover material, following which the core is enclosed within the half-cups and molding is carried out under applied pressure at 120 to 170° C. for 1 to 5 minutes.

When the cover has only one layer, the thickness of that layer may be set to from 0.3 to 3 mm. When the cover has two layers, the thickness of the outer cover layer may be set in the range of 0.3 to 2.0 mm, and the thickness of the inner cover layer may be set in the range of 0.3 to 2.0 mm. The respective layers making up the cover (cover layers) have Shore D hardnesses which, although not particularly limited, are preferably at least 40, and more preferably at least 45. The upper limit is preferably not more than 70, and more preferably not more than 65.

Numerous dimples are formed on the surface of the outermost layer of the cover, in addition to which the cover may be subjected to various types of treatment, such as surface preparation, stamping and painting. Particularly in cases where such surface treatment is imparted to the cover formed of the cover material described above, the good moldability of the cover surface enables surface treatment to be carried out effectively.

This invention provides a golf ball in which the above-described rubber composition is used as the core material for at least one layer of the core. The type of golf ball is not particularly limited, provided the ball has a core and at least one cover layer. For example, the rubber composition may be used in the core of a solid golf ball, such as a two-piece or three-piece solid golf ball having a solid core encased by a cover or a multi-piece golf ball having a construction of three or more layers, or as the core in a wound golf ball composed of a wound core encased by a single layer cover or a cover having a multilayer construction of two or more layers.

EXAMPLES

Examples of the invention and Comparative Examples are given below by way of illustration, although the invention is not limited by the following Examples.

Examples 1 to 13, Comparative Examples 1 to 7

The cores for Examples 1 to 13 and Comparative Examples 1 to 7 were fabricated using the core materials composed primarily of polybutadiene shown in Tables 1 and 2 below.

TABLE 1

| Core formulation | Example | | | | | | | | | |
|---|---|---|---|---|---|---|---|---|---|---|
| (pbw) | 1 | 2 | 3 | 4 | 5 | 6 | 7 | 8 | 9 | 10 |
| Polybutadiene: BR 51 | 100 | 100 | 100 | 100 | 100 | 100 | 100 | 100 | 100 | 100 |
| Zinc acrylate | 4 | 4 | 4 | 4 | 4 | 4 | 4 | 4 | 4 | 4 |
| Barium sulfate | as needed to adjust specific gravity | | | | | | | | | |
| Antioxidant | 0.1 | 0.1 | 0.1 | 0.1 | 0.1 | 0.1 | 0.1 | 0.1 | 0.1 | 0.1 |
| Zinc salt of pentachlorothiophenol | 0.6 | 0.6 | 0.6 | | 1 | 2 | 0.6 | 0.6 | | 1 |
| Zinc acrylate | 31 | 34 | 31 | 32 | 36 | 38 | 38 | 34 | 34 | 39 |

TABLE 1-continued

| Core formulation | Example | | | | | | | | | |
|---|---|---|---|---|---|---|---|---|---|---|
| (pbw) | 1 | 2 | 3 | 4 | 5 | 6 | 7 | 8 | 9 | 10 |
| Water | 0.5 | 0.5 | 0.5 | 0.5 | 0.5 | 0.5 | 1 | 1 | 1 | 1 |
| Organic peroxide | 1 | 0.5 | 1.5 | 1 | 1 | 1 | 0.5 | 1.5 | 1 | 1 |
| Moisture content of mixed rubber (ppm) | 1,920 | 1,902 | 2,024 | 1,989 | 1,963 | 2,035 | 2,538 | 2,640 | 2,515 | 2,491 |

TABLE 2

| Core formulation | Example | | | Comparative Example | | | | | | |
|---|---|---|---|---|---|---|---|---|---|---|
| (pbw) | 11 | 12 | 13 | 1 | 2 | 3 | 4 | 5 | 6 | 7 |
| Polybutadiene: BR 51 | 100 | 100 | 100 | 100 | 100 | 100 | 100 | 100 | 100 | 100 |
| Zinc acrylate | 4 | 4 | 4 | 4 | 4 | 4 | 4 | 4 | 4 | 4 |
| Barium sulfate | as needed to adjust specific gravity | | | as needed to adjust specific gravity | | | | | | |
| Antioxidant | 0.1 | 0.1 | 0.1 | 0.1 | 0.1 | 0.1 | 0.1 | 0.1 | 0.1 | 0.1 |
| Zinc salt of pentachlorothiophenol | 2 | 0.6 | 2 | 0.6 | 0.6 | 0.6 | 0.6 | | 1 | 2 |
| Zinc acrylate | 41 | 41 | 40 | 36 | 28 | 29 | 26 | 25 | 30 | 32 |
| Water | 1 | 3 | 3 | 1 | 1 | 1 | 1 | 1 | 1 | 1 |
| Organic peroxide | 1 | 0.5 | 1 | 1 | 1 | 0.5 | 1.5 | 1 | 1 | 1 |
| Moisture content of mixed rubber (ppm) | 2,626 | 3,024 | 3,080 | 784 | 801 | 693 | 710 | 695 | 749 | 723 |

Details on the above formulations are given below.

Polybutadiene rubber: Available under the trade name "BR 51" from JSR Corporation; polymerized with a neodymium catalyst Zinc oxide: Available under the trade name "Zinc Oxide Grade 3" from Sakai Chemical Co., Ltd.

Barium sulfate: Available under the trade name "Barico #100" from Hakusui Tech

Antioxidant: Available under the trade name "Nocrac NS-6" from Ouchi Shinko Chemical Industry Co., Ltd.

Zinc salt of pentachlorothiophenol:
   Available from Wako Pure Chemical Industries, Ltd.

Zinc acrylate: Available from Nippon Shokubai Co., Ltd.

Distilled water: Available from Wako Pure Chemical Industries, Ltd.

Organic Peroxide: Dicumyl peroxide, available under the trade name "Percumyl D" from NOF Corporation The amount of barium sulfate included was adjusted so as to set the weight of the completed golf ball to 45.4 g.

Each of the cores fabricated as described above was tested for deformation under specific loading, hardness profile, moisture content, dynamic viscoelastic properties and initial velocity of core after standing. The results are shown in Tables 4 and 5.

Deflection of the Core Under Specific Loading

The deflection by the core when compressed under a final load of 1,275 N (130 kgf) from an initial load state of 98 N (10 kgf) was measured. The average values for 30 cores (n=30) are shown in Tables 4 and 5.

Core Hardness Profile

The surface of the core being spherical, the indenter of a durometer was set so as to be substantially perpendicular to this spherical surface, and the core surface hardness in terms of JIS-C hardness was measured as specified in JIS K6301-1975.

To obtain the cross-sectional hardnesses at the center and other specific positions of the core, the core was hemispherically cut so as form a planar cross-section, and measurements were carried out by pressing the indenter of a durometer perpendicularly against the cross-section at the measurement positions. These hardnesses are indicated as JIS-C hardness values.

Core Moisture Content

Using the AQ-2100 coulombic Karl Fischer titrator and the EV-2000 evaporator (both available from Hiranuma Sangyo Co., Ltd.), measurement of the moisture content was carried out at a measurement temperature of 130° C., a preheating of 3 minutes and a background measurement time of 30 seconds. The interval time was set to 99 seconds, and the current was set to "Fast." Measurement results within a radius of 5 mm from the core center were treated as core center moisture contents, and measurement results within 5 mm of the core surface were treated as core surface moisture contents.

Dynamic Viscoelastic Properties of Core

A circular disk having a thickness of 2 mm was cut out by passing through the geometric center of the core and, treating the center and surface vicinity of this disk as the respective samples, a punching press was used to punch out 3 mm diameter specimens at the places of measurement. By employing a dynamic viscoelasticity measuring apparatus (such as that available under the product name EPLEXOR 500N from GABO) and using a compression test holder, the loss tangents (tan δ) under dynamic strains of from 0.01% to 10% were measured at an initial strain of 35%, a measurement temperature of −12° C. and a frequency of 15 Hz. At this time, measurement results within a radius of 5 mm from the core center were treated as the core center tan δ, and measurement results within 5 mm of the core surface were treated as the core surface tan δ.

Initial Velocity of Core after Standing

A core was prepared by peeling the cover from a golf ball. The core initial velocity measured on the day that the cover was peeled off was treated as the Day 0 result, and the initial core velocities when 30 days and 60 days had elapsed thereafter were treated as the Day 30 and Day 60 results. The core was left to stand in a chamber controlled to a temperature of 24° C. and 40% humidity. The initial velocity was measured using an initial velocity measuring apparatus of the same type as the USGA drum rotation-type initial velocity instrument approved by the R&A. The core was tested in a chamber at a room temperature of 23±2° C. after being held isothermally in a 23±1° C. environment for at least 3 hours. Twenty balls were each hit twice. The time taken for the ball to traverse a distance of 6.28 ft (1.91 m) was measured and used to compute the initial velocity. This cycle was carried out over a period of about 15 minutes.

Next, using a three-layer cover (envelope layer, intermediate layer and outermost layer) having the properties shown in Table 3 below, a multi-piece solid golf ball having a four-layer construction composed of a core encased by, in order, an envelope layer, an intermediate layer and an outermost layer was obtained for each of the cores produced above. Although not shown in a diagram, dimples in a certain pattern common to all the balls were formed on the surface of the ball cover in all of the Examples according to the invention and the Comparative Examples.

TABLE 3

| Outermost layer | Material | urethane *1 |
|---|---|---|
| | Thickness | 0.8 mm |
| Intermediate layer | Material | ionomer *2 |
| | Thickness | 1.13 mm |
| Envelope layer (layer adjacent to core) | Material | ionomer *3 |
| | Thickness | 1.35 mm |

*1 A urethane compound that uses three types of urethane: Pandex T8283, Pandex T8290 and Pandex T8295, all from DIC-Bayer Polymer, Ltd.
*2 An ionomer compound that uses three types of ionomer: Himilan 1605, Himilan 1706 and Himilan 1557, all from DuPont-Mitsui Polychemicals Co., Ltd.
*3 HPF 1000, from E. I. DuPont de Nemours & Co.

The properties of the golf balls in these Examples and Comparative Examples were evaluated as follows. The results are presented in Tables 4 and 5.
[Evaluation of Ball Properties]
Ball Deformation (Deflection) (Mm)
The deflection (mm) of a golf ball when compressed under a final load of 1,275 N (130 kgf) from an initial load state of 98 N (10 kgf) was measured.
Spin Rate of Ball (Rpm)
A driver (W#1) manufactured by Bridgestone Sports Co., Ltd. (TourStage ViQ (2012 model); loft angle, 11.5°) was mounted on a golf swing robot and used to strike balls at a head speed (HS) of 45 m/s. A number six iron (I#6) manufactured by Bridgestone Sports Co., Ltd. (TourStage ViQ (2012 model)) was mounted on a golf swing robot and used to strike balls at a head speed (HS) of 38 m/s. The balls immediately after being struck were measured with an apparatus for measuring the initial conditions.

TABLE 4

| | | Example | | | | |
|---|---|---|---|---|---|---|
| | | 1 | 2 | 3 | 4 | 5 |
| Core Properties | Diameter (mm) | 36.95 | 36.95 | 36.95 | 36.95 | 36.95 |
| | Weight (g) | 32.02 | 32.01 | 32.04 | 32.03 | 32.04 |
| | Deformation under load (mm) | 4.02 | 4.03 | 3.92 | 3.95 | 4.05 |
| Hardness profile (JIS-C) | Center | 57.5 | 56.9 | 57.8 | 57.3 | 57.1 |
| | 6 mm from center (A) | 58.9 | 58.3 | 59.5 | 59.0 | 58.5 |
| | 16 mm from center (B) | 76.8 | 76.9 | 77.8 | 77.2 | 77.4 |
| | Surface | 80.8 | 80.1 | 81.3 | 80.6 | 80.3 |
| | Surface − Center | 23.3 | 23.2 | 23.5 | 23.3 | 23.2 |
| | (B) − (A) hardness difference | 17.9 | 18.6 | 18.3 | 18.2 | 18.9 |
| Core moisture content (ppm) | Center | 1,631 | 1,420 | 1,582 | 1,458 | 1,527 |
| | Surface | 1,510 | 1,317 | 1,472 | 1,367 | 1,404 |
| | Surface − Center | −121 | −103 | −110 | −91 | −123 |
| tan δ at core center | 0.1% strain | 0.045 | 0.042 | 0.048 | 0.044 | 0.047 |
| | 1% strain | 0.05 | 0.045 | 0.053 | 0.048 | 0.051 |
| | 10% strain | 0.065 | 0.059 | 0.068 | 0.062 | 0.066 |
| | tan δ slope for 10% strain and 1% strain (Sc) | 0.0017 | 0.0015 | 0.0017 | 0.0016 | 0.0017 |
| tan δ at core surface | 0.1% strain | 0.08 | 0.073 | 0.06 | 0.068 | 0.075 |
| | 1% strain | 0.087 | 0.074 | 0.069 | 0.073 | 0.076 |
| | 10% strain | 0.145 | 0.144 | 0.137 | 0.128 | 0.136 |
| | tan δ slope for 10% strain and 1% strain (So) | 0.0064 | 0.0078 | 0.0076 | 0.0061 | 0.0067 |
| Difference in tan δ slopes (So − Sc) | | 0.0047 | 0.0063 | 0.0059 | 0.0045 | 0.005 |
| Initial velocity of core after standing (m/s) | Day 0 of standing (V0) | 77.33 | 77.30 | 77.32 | 76.69 | 77.47 |
| | Day 30 of standing (V30) | 77.11 | 77.12 | 77.13 | 76.49 | 77.22 |
| | Day 60 of standing (V60) | 76.89 | 76.93 | 76.91 | 76.30 | 77.00 |
| | Initial velocity difference (V0 − V30) | 0.22 | 0.18 | 0.19 | 0.20 | 0.25 |
| | Initial Velocity difference (V0 − V60) | 0.44 | 0.37 | 0.41 | 0.39 | 0.47 |

TABLE 4-continued

|  |  |  |  |  |  |  |
|---|---|---|---|---|---|---|
| Manufactured ball | Deformation under load (mm) | 2.98 | 3.00 | 2.92 | 2.90 | 3.01 |
| Spin rate (rpm) | Driver | 2,443 | 2,430 | 2,460 | 2,465 | 2,421 |
|  | Number 6 iron | 5,237 | 5,214 | 5,329 | 5,388 | 5,160 |

|  |  | Example ||||| 
|---|---|---|---|---|---|---|
|  |  | 6 | 7 | 8 | 9 | 10 |
| Core Properties | Diameter (mm) | 36.95 | 36.95 | 36.95 | 36.95 | 36.95 |
|  | Weight (g) | 32.05 | 32.01 | 32.04 | 32.03 | 32.04 |
|  | Deformation under load (mm) | 4.01 | 4.05 | 4.07 | 3.97 | 4.02 |
| Hardness profile (JIS-C) | Center | 57.3 | 56.0 | 56.4 | 56.9 | 56.7 |
|  | 6 mm from center (A) | 58.7 | 57.2 | 57.7 | 58.1 | 58.0 |
|  | 16 mm from center (B) | 77.0 | 77.9 | 78.0 | 78.7 | 79.3 |
|  | Surface | 80.5 | 82.9 | 83.6 | 84.2 | 83.8 |
|  | Surface − Center | 23.2 | 26.9 | 27.2 | 27.3 | 27.1 |
|  | (B) − (A) hardness difference | 18.3 | 20.7 | 20.3 | 20.6 | 21.3 |
| Core moisture content (ppm) | Center | 1,486 | 2,238 | 2,101 | 1,985 | 2,048 |
|  | Surface | 1,368 | 1,916 | 1,720 | 1,584 | 1,653 |
|  | Surface − Center | −118 | −322 | −381 | −401 | −395 |
| tan δ at core center | 0.1% strain | 0.04 | 0.04 | 0.035 | 0.038 | 0.037 |
|  | 1% strain | 0.045 | 0.043 | 0.039 | 0.042 | 0.04 |
|  | 10% strain | 0.06 | 0.057 | 0.053 | 0.055 | 0.054 |
|  | tan δ slope for 10% strain and 1% strain (Sc) | 0.0017 | 0.0015 | 0.0016 | 0.0014 | 0.0016 |
| tan δ at core surface | 0.1% strain | 0.085 | 0.072 | 0.067 | 0.063 | 0.079 |
|  | 1% strain | 0.088 | 0.079 | 0.069 | 0.066 | 0.085 |
|  | 10% strain | 0.147 | 0.135 | 0.129 | 0.129 | 0.145 |
|  | tan δ slope for 10% strain and 1% strain (So) | 0.0066 | 0.0062 | 0.0067 | 0.007 | 0.0067 |
| Difference in tan δ slopes (So − Sc) |  | 0.0049 | 0.0047 | 0.0051 | 0.0056 | 0.0051 |
| Initial velocity of core after standing (m/s) | Day 0 of standing (V0) | 77.62 | 77.18 | 77.2 | 76.55 | 77.34 |
|  | Day 30 of standing (V30) | 77.39 | 76.96 | 76.99 | 76.36 | 77.12 |
|  | Day 60 of standing (V60) | 77.16 | 76.76 | 76.77 | 76.18 | 76.95 |
|  | Initial velocity difference (V0 − V30) | 0.23 | 0.22 | 0.21 | 0.19 | 0.22 |
|  | Initial Velocity difference (V0 − V60) | 0.46 | 0.42 | 0.43 | 0.37 | 0.39 |
| Manufactured ball | Deformation under load (mm) | 2.99 | 2.87 | 2.89 | 2.84 | 2.85 |
| Spin rate (rpm) | Driver | 2,415 | 2,463 | 2,454 | 2,472 | 2,470 |
|  | Number 6 iron | 5,183 | 5,385 | 5,352 | 5,459 | 5,435 |

TABLE 5

|  |  | Example ||| Comparative Example ||
|---|---|---|---|---|---|---|
|  |  | 11 | 12 | 13 | 1 | 2 |
| Core properties | Diameter (mm) | 36.95 | 36.95 | 36.95 | 36.85 | 36.85 |
|  | Weight (g) | 32.03 | 32.04 | 32.01 | 31.80 | 31.80 |
|  | Deformation under load (mm) | 3.96 | 3.96 | 3.99 | 2.72 | 3.80 |
| Hardness profile (JIS-C) | Center | 56.7 | 55.6 | 55.8 | 66.4 | 63.2 |
|  | 6 mm from center (A) | 58.1 | 56.9 | 57.0 | 67.9 | 64.6 |
|  | 16 mm from center (B) | 79.1 | 78.8 | 79.1 | 80.1 | 76.0 |
|  | Surface | 83.9 | 84.5 | 84.9 | 84.0 | 80.2 |
|  | Surface − Center | 27.2 | 28.9 | 29.1 | 17.6 | 17.0 |
|  | (B) − (A) hardness difference | 21.0 | 21.9 | 22.1 | 12.2 | 11.4 |

TABLE 5-continued

|  |  |  |  |  |  |  |
|---|---|---|---|---|---|---|
| Core moisture content (ppm) | Center | 2,133 | 2,384 | 2,489 | 884 | 737 |
|  | Surface | 1,651 | 1,735 | 1,767 | 1,621 | 1,669 |
|  | Surface − Center | −482 | −649 | −722 | 737 | 932 |
| tan δ at core center | 0.1% strain | 0.04 | 0.036 | 0.038 | 0.054 | 0.049 |
|  | 1% strain | 0.044 | 0.039 | 0.041 | 0.061 | 0.048 |
|  | 10% strain | 0.057 | 0.051 | 0.055 | 0.097 | 0.093 |
|  | tan δ slope for 10% strain and 1% strain (Sc) | 0.0014 | 0.0013 | 0.0015 | 0.004 | 0.005 |
| tan δ at core surface | 0.1% strain | 0.077 | 0.069 | 0.082 | 0.082 | 0.072 |
|  | 1% strain | 0.079 | 0.071 | 0.083 | 0.096 | 0.075 |
|  | 10% strain | 0.139 | 0.13 | 0.143 | 0.136 | 0.126 |
|  | tan δ slope for 10% strain and 1% strain (So) | 0.0067 | 0.0066 | 0.0067 | 0.0045 | 0.0057 |
| Difference in tan δ slopes (So − Sc) |  | 0.0053 | 0.0053 | 0.0052 | 0.0005 | 0.0007 |
| Initial velocity of core after standing (m/s) | Day 0 of standing (V0) | 77.49 | 77.01 | 77.41 | 78.05 | 77.28 |
|  | Day 30 of standing (V30) | 77.25 | 76.83 | 77.23 | 77.71 | 76.95 |
|  | Day 60 of standing (V60) | 77.03 | 76.66 | 77.02 | 77.33 | 76.57 |
|  | Initial velocity difference (V0 − V30) | 0.24 | 0.18 | 0.18 | 0.34 | 0.33 |
|  | Initial Velocity difference (V0 − V60) | 0.46 | 0.35 | 0.39 | 0.72 | 0.71 |
| Manufactured ball | Deformation under load (mm) | 2.86 | 2.78 | 2.80 | 2.25 | 2.90 |
| Spin rate (rpm) | Driver | 2,475 | 2,529 | 2,505 | 2,929 | 2,572 |
|  | Number 6 iron | 5,428 | 5,505 | 5,493 | 6,885 | 5,903 |

|  |  | Comparative Example | | | | |
|---|---|---|---|---|---|---|
|  |  | 3 | 4 | 5 | 6 | 7 |
| Core properties | Diameter (mm) | 36.95 | 36.95 | 36.95 | 36.95 | 36.95 |
|  | Weight (g) | 32.02 | 32.02 | 32.02 | 32.02 | 32.02 |
|  | Deformation under load (mm) | 3.97 | 3.82 | 3.86 | 3.90 | 3.94 |
| Hardness profile (JIS-C) | Center | 62.3 | 63.5 | 63.4 | 63.1 | 63.3 |
|  | 6 mm from center (A) | 63.6 | 64.7 | 64.7 | 64.8 | 64.9 |
|  | 16 mm from center (B) | 74.9 | 76.2 | 76.1 | 76.8 | 76.5 |
|  | Surface | 78.6 | 80.3 | 80.4 | 80.2 | 80.4 |
|  | Surface − Center | 16.3 | 16.8 | 17.0 | 17.1 | 17.1 |
|  | (B) − (A) hardness difference | 11.3 | 11.5 | 11.4 | 12.0 | 11.6 |
| Core moisture content (ppm) | Center | 950 | 791 | 825 | 935 | 886 |
|  | Surface | 1,797 | 1,584 | 1,442 | 1,691 | 1,677 |
|  | Surface − Center | 847 | 793 | 617 | 756 | 791 |
| tan δ at core center | 0.1% strain | 0.047 | 0.053 | 0.046 | 0.055 | 0.051 |
|  | 1% strain | 0.049 | 0.055 | 0.05 | 0.056 | 0.054 |
|  | 10% strain | 0.083 | 0.098 | 0.091 | 0.091 | 0.101 |
|  | tan δ slope for 10% strain and 1% strain (Sc) | 0.0038 | 0.0048 | 0.0045 | 0.0039 | 0.0052 |
| tan δ at core surface | 0.1% strain | 0.087 | 0.072 | 0.081 | 0.08 | 0.071 |
|  | 1% strain | 0.088 | 0.076 | 0.091 | 0.082 | 0.074 |
|  | 10% strain | 0.133 | 0.129 | 0.138 | 0.124 | 0.129 |
|  | tan δ slope for 10% strain and 1% strain (So) | 0.005 | 0.0059 | 0.0052 | 0.0047 | 0.0061 |
| Difference in tan δ slopes (So − Sc) |  | 0.0012 | 0.0011 | 0.0007 | 0.0008 | 0.0009 |
| Initial velocity of core after standing (m/s) | Day 0 of standing (V0) | 77.19 | 77.2 | 76.73 | 77.49 | 77.65 |
|  | Day 30 of standing (V30) | 76.83 | 76.82 | 76.38 | 77.1 | 77.27 |
|  | Day 60 of standing (V60) | 76.44 | 76.46 | 76.04 | 76.74 | 76.88 |
|  | Initial velocity difference (V0 − V30) | 0.36 | 0.38 | 0.35 | 0.39 | 0.38 |
|  | Initial Velocity difference (V0 − V60) | 0.75 | 0.74 | 0.69 | 0.75 | 0.77 |

TABLE 5-continued

| Manufactured ball | Deformation under load (mm) | 3.12 | 3.00 | 3.03 | 3.09 | 3.10 |
|---|---|---|---|---|---|---|
| Spin rate (rpm) | Driver | 2,554 | 2,607 | 2,584 | 2,546 | 2,540 |
| | Number 6 iron | 5,824 | 5,986 | 5,935 | 5,827 | 5,841 |

From the results in Tables 4 and 5 above, it is apparent that the golf balls of the Working Examples of the invention all achieved a reduced spin rate on shots with a driver, and moreover were excellent in that they exhibited little change over time in resilience.

By contrast, in each of Comparative Examples 1 to 7, because the moisture content in the rubber composition prior to vulcanization was low, the core from which, after molding of the cover, the cover had been removed exhibited a large decrease in initial velocity. Moreover, because the difference between the tan δ slope at the core surface and the tan δ slope at the core center was small, the spin rates on shots with a driver and a number six iron were high. Also, because the spin rate tends to be high when the amount of deformation under load of a manufactured ball is small, and tends to be low when the amount of deformation under load is large, it is necessary to carry out comparisons between manufactured balls having the same amount of deformation under load.

Japanese Patent Application No. 2014-252721 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one layer or a plurality of layers, wherein the core is formed of a material molded under heat from a rubber composition comprising:
   (A) a base rubber,
   (B) an organic peroxide, and
   (C) a metal monocarboxylate; and
   letting $\tan \delta_1$ be the loss tangent at a dynamic strain of 1% and $\tan \delta_{10}$ be the loss tangent at a dynamic strain of 10% when the loss tangents of the core center and the core surface are measured at a temperature of −12° C. and a frequency of 15 Hz, and defining the tan δ slope as $(\tan \delta_{10} - \tan \delta_1)/(10\% - 1\%)$, the difference between the tan δ slope at the core surface and the tan δ slope at the core center is larger than 0.002, and the tan δ slope at the core surface is larger than the tan δ slope at the core center.

2. The golf ball of claim 1, wherein the difference (B)−(A) within the core between the JIS-C cross-sectional hardness (A) at a position 6 mm from the core center and the JIS-C cross-sectional hardness (B) at a position 16 mm from the core center is larger than 13.

3. The golf ball of claim 1 which satisfies the condition $V_0 - V_{60} < 0.7$, wherein $V_0$ is the initial velocity of the core in the golf ball after the cover has been molded, as measured after peeling away the cover, and $V_{60}$ is the core initial velocity measured 60 days after measuring $V_0$.

4. The golf ball of claim 1, wherein the moisture content in the rubber composition prior to vulcanization is at least 1,000 ppm.

5. The golf ball of claim 1 wherein, in the vulcanized core, the core center has a higher moisture content than the core surface.

6. The golf ball of claim 1, wherein the rubber composition contains from 0.1 to 5 parts by weight of an organosulfur compound per 100 parts by weight of the base rubber.

7. The golf ball of claim 1, wherein the core of the golf ball after the cover has been molded has an initial velocity $V_0$, as measured after peeling away the cover, which is at least 77.0 m/s and not more than 78.5 m/s.

8. The golf ball of claim 1, wherein the JIS-C hardness difference obtained by subtracting the core center hardness from the core surface hardness is at least 20 and not more than 40.

9. The golf ball of claim 1, wherein the base rubber serving as component (A) is a polybutadiene synthesized using a rare-earth catalyst or a group VIII metal compound catalyst.

10. The golf ball of claim 1, wherein the $\tan \delta_1$ at the core surface is larger than the $\tan \delta_1$ at the core center.

11. The golf ball of claim 1, wherein the $\tan \delta_{10}$ at the core surface is larger than the $\tan \delta_{10}$ at the core center.

12. The golf ball of claim 1, wherein the core is a single layer and the diameter of the core is at least 32 mm.

* * * * *